Oct. 3, 1939.   C. F. HIRSHFELD   2,175,118
SPRING SECURING MEANS
Filed Feb. 27, 1937
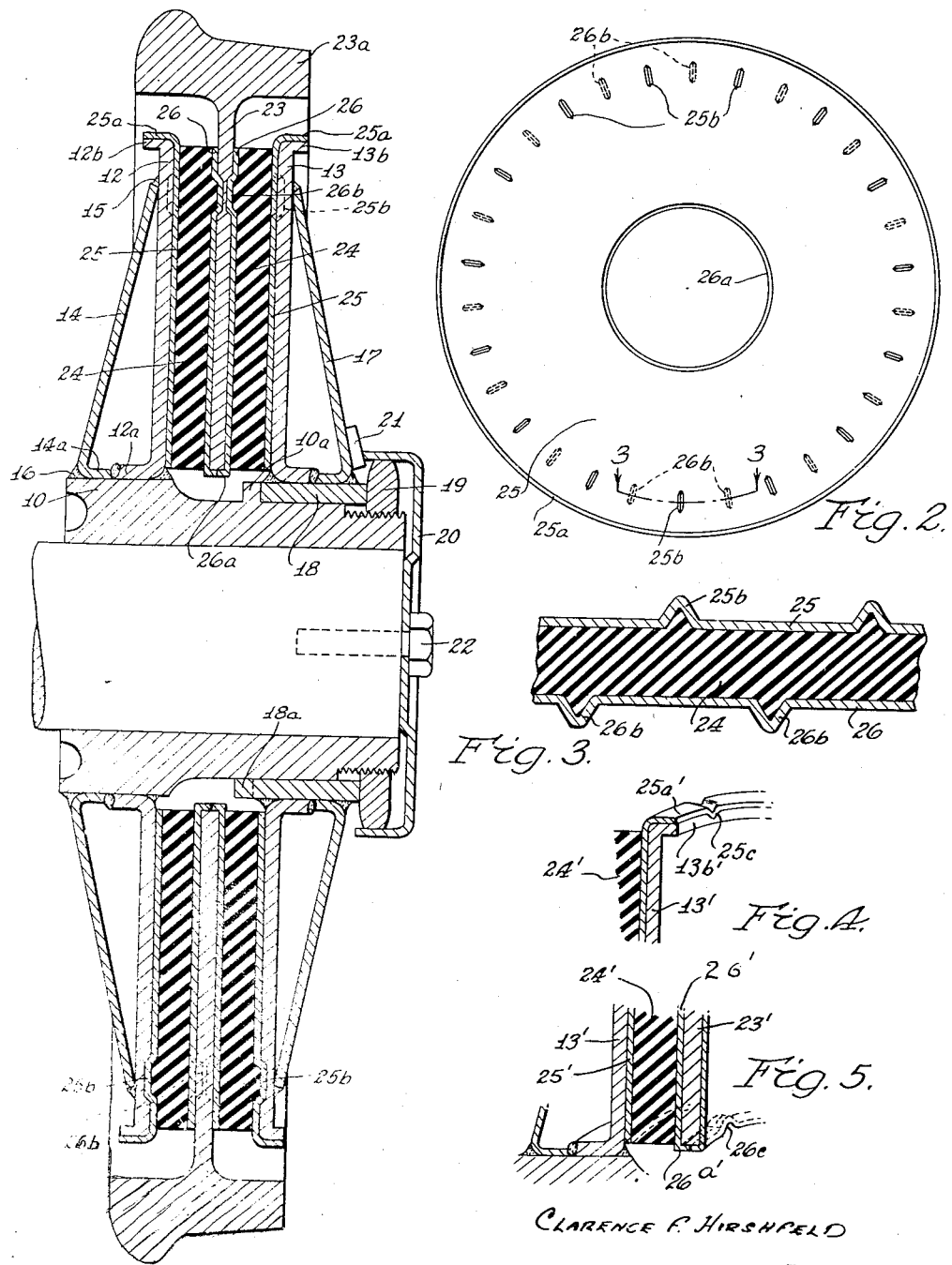
CLARENCE F. HIRSHFELD
INVENTOR.
BY J. Windsor Davis
ATTORNEY.

Patented Oct. 3, 1939

2,175,118

UNITED STATES PATENT OFFICE 2,175,118

SPRING SECURING MEANS

Clarence F. Hirshfeld, Detroit, Mich., assignor to Transit Research Corporation, New York, N. Y., a corporation of New York Application February 27, 1937, Serial No. 128,125

16 Claims. (Cl. 295—11)

This invention relates to resilient wheels, particularly for rail vehicles, of the type wherein the hub is supported from a tire through the medium of slabs or discs of elastic material under shear loading.

The wheel as herein contemplated is composed of a hub portion having main side plate members radiating therefrom, a tire or rail contacting portion equipped with a wide web, or plate, and slabs or discs of rubber between the web and each plate member adapted to transmit the loading of the hub to the tire in shear. For purposes of centering during assembly, for easy replacement and for many other reasons, it has been found desirable to surface bond to each side of each rubber disc a thin disc of metal and to removably secure these metallic discs to the main plates and web, thus forming removable springing elements. Dowels stamped out from the thin discs with or without welded in reenforcements and fitting into holes in the plates and web have been used to prevent movement of the discs relative to the plates. It is an object of this invention to provide simpler means for locating the metallic discs with respect to the main side plates and the central plate or web.

Another object of this invention is to provide a dual means for locating each metallic sheet with respect to the plate with which it is in contact, the means comprising a portion for centering the sheet and plate with respect to each other and a second portion for orienting them with respect to each other and adapted to come into engagement only after the two members are centered. With a dual means of this type, the members can first be centered and can then be rotated with respect to each other until they are properly oriented. Assembly is facilitated because the placing of each member in the proper position can be done in two stages.

Other objects and advantages will become hereinafter more fully apparent as reference is had to the accompanying drawing wherein:

Fig. 1 is a sectional view, taken through the axis, of one of the preferred embodiments of my invention.

Fig. 2 is an elevation of one of the springing elements of the embodiment shown in Fig. 1.

Fig. 3 is a sectional view on the line 3—3 of Fig. 2, looking in the direction of the arrows.

Fig. 4 is a perspective view of a fragment of a modified form of the invention.

Fig. 5 is a perspective of another fragment of the modified form.

The embodiment of the invention shown in the drawing comprises a hub 10 pressed onto the end of an axle 11 and having two circular side plates 12 and 13 radiating therefrom. The side plate 12 nearest the center of the axle 11 has a central flange 12a fitting over the hub 10, the base of the flange 12a being welded to the hub 10 to permanently secure them together. In addition, the side plate 12 is supported by a frustoconical bracing plate 14 whose concave side faces the outer face of the side plate 12, the periphery of the bracing 14 being welded to the side plate 12 at 15. The center of the bracing plate 14 is formed into a collar or flange 14a fitting over the inner end of the hub 10 and is welded thereto at 16.

The other side plate 13 is similarly formed and provided with a similar bracing plate 17 welded thereto, but this side plate 13 and bracing plate 17, instead of being welded to the hub 10, are welded to a sleeve 18 which slides over the outer end of the hub 10 so that they can be removed. The outer end of the hub 10 is smaller in diameter than the inner end, allowing the sleeve 18 which fits over it to have the same outside diameter as the inner end of the hub and permitting the two side plates 12 and 13 and the two bracing plates 14 and 17 to be duplicates.

The sleeve 18 is prevented from rotating with respect to the hub 10 by having its end notched or castellated, the resulting rectangular teeth 18a fitting between cooperating teeth 10a on the hub. The sleeve 18 is held against the teeth 10a on the hub 10 by a ring-like nut 19 screwed onto the end of the hub 10. The nut is locked by a cap 20 whose interior is shaped to fit the sides of the nut 19. The cap 20, in turn, is prevented from rotating by a slot in its edge which engages a lug 21 on the adjacent bracing plate 17 and is held in place by a small bolt 22 extending into the end of the axle 11.

A central plate or web 23 lies midway between the two sides plates 12 and 13 and carries a tire 23a formed integrally with it. A large aperture in the middle of the central plate 23 allows the hub 10 to pass through it with considerable clearance. This ensures that the central plate and hub will never be in direct contact but that the load will at all times be transmitted in shear from the central plate 23 to the side plates 12 and 13 through the cushioning elements 24, 25 and 26 which lie between them.

The cushioning elements comprise circular slabs or discs of rubber 24, with thin sheets or discs 25 and 26 of metal bonded to the sides of the slabs 24 and interlocked with the plates 12, 13 and 23. In the embodiment of the invention illustrated, there are two slabs of rubber 24, one at each side of the central plate 23 and between it and the side plates 12 and 13, and they are made thick enough so that they and the central plate 23 are clamped tightly together between the side plates 12 and 13 when the outer side plate 13 and the sleeve 18 which carries it are forced into position by the large nut 19 on the end of the hub 10.

The slabs of rubber 24 are surface bonded to metallic discs or sheets 25 and 26 distinct from and removably connected to the plates 12, 13 and 23 against which they lie, forming springing elements which can be easily removed in case it becomes necessary to replace them. Each of the sheets 25 and 26 is connected to the plate 12, 13 or 23 with which it is in contact by two distinct and separate types of load transferring means, one for keeping the sheets 25 and 26 concentric with the plates 12, 13 and 23 and for transferring the weight of the car and another for preventing each sheet 25 or 26 from rotating with respect to its contacting plate 12, 13 or 23 and for transmitting the accelerational and decelerational torques. For transmitting the weight of the car, the inner sheets 26 lying against the central plate 23 are provided with flanges 26a around their central apertures. These flanges fit into the central aperture in the plate 23 and keep the sheets 26 and plate 23 concentric. The outer sheets 25 are provided with peripheral flanges 25a which fit over peripheral flanges 12b and 13b on the side plates 12 and 13 and keep them concentric. For transmitting the accelerational and decelerational forces, the sheets 25 and 26 are provided with elongated radially-extending bosses 25b and 26b which fit into radial grooves in the plates 12, 13 and 23. The bosses 25b and 26b are formed by stamping the sheets 25 and 26 and are arranged like the spokes of a wheel on each sheet, and the bosses 25b on one sheet 25 of a springing unit or "rubber sandwich" 24, 25, 26 are preferably spaced around between the bosses 26b on the other sheet 26 of the "sandwich", as shown in Fig. 2.

While the form of the invention shown in Figs. 1 to 3 is at present the preferred form, certain advantages, especially in manufacture, are provided by the modification shown in Figs. 4 and 5. In this form of wheel, the metal sheets 25' and 26' bonded to the rubber slabs 24' are centered on the plates 13' and 23' by flanges 25a' and 26a' as in the form shown in Figs. 1 to 3, but a different torque transmitting means is provided. This means consists of bosses 25c and 26c on the flanges 25a' and 26a' which fit into suitable grooves in the inner edge of the center plate 23' and the flange 13b' of the side plates 13'. The grooves in the plates 13' and 23' being all parallel to each other can be economically formed by broaching as contrasted to the separate milling of each groove in the faces of the plates 13 and 23 in the first form of the invention.

What I claim is:

1. A wheel comprising a hub, a pair of spaced radial side plates secured thereto, a radial central plate lying between said side plates and spaced radially from said hub, a tire carried by said central plate, flat slabs of rubber lying between said plates, sheets of metal bonded to the faces of said slabs of rubber and lying against said plates, means for preventing translational movement of said sheets with respect to said plates, and means elongated in a direction radially of said hub and separated from said other means and providing substantially radially extending planar bearing surfaces for preventing rotational movement of said sheets with respect to said plates.

2. A wheel as described in claim 1 in which said first mentioned means comprises annular flanges on said sheets engaging cylindrical surfaced flanges on said plates, said sheet and plate flanges being concentric with said hub.

3. A wheel as described in claim 1 in which said secondly mentioned means comprises bosses stamped in said sheets and fitting into recesses in said plates, said bosses being elongated radially of the wheel.

4. A wheel as described in claim 1 in which said secondly mentioned means comprises elongate bosses stamped in said sheets and fitting into recesses in said plates, said bosses extending on said sheets with their length perpendicular to the axis of said wheel and being U or V-shaped in cross-section.

5. A wheel comprising a hub, a pair of spaced radial side plates secured thereto and having outwardly facing peripheral cylindrical surfaces concentric with said hub, a radial central plate lying between said plates and spaced radially from said hub, a tire carried by said central plate, flat slabs of rubber lying between said plates, sheets of metal bonded to the faces of said slabs of rubber and lying against said plates, means for preventing movement of said central plate with respect to the sheets lying between it and the rubber slabs, means for preventing rotational movement of said side plates with respect to the sheets lying between them and the rubber slabs, and peripheral flanges on said last-mentioned sheets and in contact with the cylindrical surfaces on the side plates.

6. A wheel comprising a hub, a pair of spaced radial side plates secured thereto, a radial central plate lying between said side plates and having a central aperture through which said hub passes with considerable clearance, a tire carried by said central plate, flat slabs of rubber lying between said plates, sheets of metal bonded to the faces of said slabs of rubber and lying against said plates, means for preventing movement of said side plates with respect to the sheets lying between them and the rubber slabs, means for preventing rotational movement of said central plate with respect to the sheets lying between it and the rubber slabs, and flanges on said last-mentioned sheets fitting into the central aperture in the central plate.

7. In a wheel having slabs of rubber bonded between sheets of metal and serving as a resilient weight bearing and torque transmitting medium, annular projections on said sheets concentric with said wheels for transmitting said weight, non-concentric projections on said sheets for transmitting said torque, and rigid members fitting said projections, said annular projections extending farther from said sheets than said non-concentric projections.

8. In a wheel having a hub and a rim and slabs of rubber bonded between sheets of metal and lying between radial plates connected alternately to said hub and said rim, cylindrical surfaces on said plates concentric with said hub, flanges on said sheets, said flanges being on the sides of said sheets away from said rubber slabs and fitting said cylindrical surfaces, and projections on the faces of said sheets fitting into recesses in said plates, 9. In a wheel having a hub and a rim and slabs of rubber bonded between sheets of metal and lying between radial plates connected alternately to said hub and said rim, cylindrical surfaces on said plates concentric with said hub, flanges on said sheets, said flanges being on the sides of said sheets away from said rubber slabs and fitting said cylindrical surfaces, and projections on the faces of said sheets fitting into recesses in said plates, the height of said projections being less than the width of said flanges.

10. In a wheel having a hub and a rim and slabs of rubber bonded between sheets of metal and lying between radial plates connected alternately to said hub and said rim, cylindrical surfaces on said plates concentric with said hub, flanges on said sheets, said flanges being on the sides of said sheets away from said rubber slabs and fitting said cylindrical surfaces, and projections on the faces of said sheets fitting into recesses in said plates, said projections being bosses stamped up out of said sheets.

11. In a wheel having a hub and a rim and slabs of rubber bonded between sheets of metal and lying between radial plates connected alternately to said hub and said rim, cylindrical surfaces on said plates concentric with said hub, flanges on said sheets, said flanges being on the sides of said sheets away from said rubber slabs and fitting said cylindrical surfaces, and projections on the faces of said sheets fitting into recesses in said plates, at least one of said cylindrical surfaces being the edge of one of said plates.

12. In a wheel having a hub and a rim and slabs of rubber bonded between sheets of metal and lying between radial plates connected alternately to said hub and said rim, cylindrical surfaces on said plates concentric with said hub, flanges on said sheets, said flanges being on the sides of said sheets away from said rubber slabs and fitting said cylindrical surfaces, and projections on the faces of said sheets fitting into recesses in said plates, the edges of said slabs of rubber being closely adjacent the flanged edges of said sheets.

13. A wheel comprising a hub, a pair of spaced radial side plates secured thereto and having outwardly facing peripheral cylindrical surfaces concentric with said hub, a radial central plate lying between said plates and spaced radially from said hub, a tire carried by said central plate, flat slabs of rubber lying between said plates, sheets of metal bonded to the faces of said slabs of rubber and lying against said plates, means for preventing movement of said central plate with respect to the sheets lying between it and the rubber slabs, and peripheral flanges on the other sheets and in contact with the cylindrical surfaces on the side plates, said flanges having bosses fitting into depressions in said surfaces.

14. A wheel comprising a hub, a pair of spaced radial side plates secured thereto, a radial central plate lying between said side plates and having a central aperture through which said hub passes with considerable clearance, a tire carried by said central plate, flat slabs of rubber lying between said plates, sheets of metal bonded to the faces of said slabs of rubber and lying against said plates, means for preventing movement of said side plates with respect to the sheets lying between them and the rubber slabs, and flanges on the other sheets fitting into the central aperture in the central plate, said flanges having bosses fitting into grooves in the walls of said central aperture.

15. A wheel comprising a hub, a pair of spaced radial side plates secured thereto, a radial central plate lying between said side plates and spaced radially from said hub, a tire carried by said central plate, flat slabs of rubber lying between said plates, sheets of metal bonded to the faces of said slabs of rubber and lying against said plates, means for preventing translational movement of said sheets with respect to said plates, and means separate from said other means for preventing rotational movement of said sheets with respect to said plates, said first mentioned means being constructed and arranged to come into engagement before said second mentioned means as the wheel is assembled.

16. A wheel comprising a hub, a pair of spaced radial side plates secured thereto, a radial central plate lying between said side plates and spaced radially from said hub, a tire carried by said central plate, flat slabs of rubber lying between said plates, sheets of metal bonded to the faces of said slabs of rubber and lying against said plates, means for preventing translational movement of said sheets with respect to said plates, and means separate from said other means for preventing rotational movement of said sheets with respect to said plates, said first mentioned means comprising annular flanges on said sheets and concentric with said hub, said flanges engaging cylindrical surfaces on said plates.

CLARENCE F. HIRSHFELD.